(12) United States Patent
Wick et al.

(10) Patent No.: US 9,917,837 B1
(45) Date of Patent: Mar. 13, 2018

(54) DETERMINING TRUSTED SOURCES FROM WHICH TO DOWNLOAD CONTENT TO A MOBILE DEVICE

(75) Inventors: Ryan Alan Wick, Apollo Beach, FL (US); Raymond Emilio Reeves, Olathe, KS (US); John Marvin Jones, III, Overland Park, KS (US); Michael Adetokunbo Adeniji, Silver Spring, MD (US)

(73) Assignee: Sprint Communications Company L.P., Overland Park, KS (US)

( * ) Notice: Subject to any disclaimer, the term of this patent is extended or adjusted under 35 U.S.C. 154(b) by 1155 days.

(21) Appl. No.: 12/253,381

(22) Filed: Oct. 17, 2008

(51) Int. Cl.
| | | |
|---|---|---|
| G06F 7/04 | (2006.01) | |
| G06F 15/16 | (2006.01) | |
| G06F 17/30 | (2006.01) | |
| H04L 29/06 | (2006.01) | |
| H04L 29/12 | (2006.01) | |

(52) U.S. Cl.
CPC .......... H04L 63/10 (2013.01); H04L 61/1511 (2013.01)

(58) Field of Classification Search
USPC ............................... 726/3; 380/247; 455/411
See application file for complete search history.

(56) References Cited

U.S. PATENT DOCUMENTS

| | | | | |
|---|---|---|---|---|
| 6,141,681 A | * | 10/2000 | Kyle | ............................. 709/206 |
| 6,353,926 B1 | * | 3/2002 | Parthesarathy et al. | ...... 717/170 |
| 7,340,057 B2 | * | 3/2008 | Martin et al. | ................. 380/247 |
| 7,426,382 B2 | * | 9/2008 | Aerrabotu et al. | ........... 455/411 |
| 7,657,599 B2 | * | 2/2010 | Smith | ............................. 709/206 |
| 8,073,941 B2 | * | 12/2011 | Binyamin | ..................... 709/223 |
| 8,473,598 B1 | * | 6/2013 | Piper | ............................ 709/223 |
| 8,566,785 B2 | * | 10/2013 | Narahara | .......... G06F 17/30817 717/106 |
| 2003/0037138 A1 | * | 2/2003 | Brown | ..................... G06F 21/55 709/225 |
| 2005/0060412 A1 | * | 3/2005 | Chebolu | ............. G06F 9/44505 709/227 |
| 2006/0031493 A1 | * | 2/2006 | Cugi | ....................... H04L 67/06 709/225 |
| 2006/0090192 A1 | * | 4/2006 | Corby | ..................... G06F 21/51 726/1 |
| 2006/0253446 A1 | * | 11/2006 | Leong | ............... G06F 17/30867 |
| 2008/0313732 A1 | * | 12/2008 | Pierce | ..................... G06F 21/62 726/22 |
| 2009/0287705 A1 | * | 11/2009 | Schneider | ......... G06F 17/30864 |
| 2013/0333039 A1 | * | 12/2013 | Kelly | ..................... G06F 21/51 726/24 |

OTHER PUBLICATIONS

Unknown author; Microsoft Office System: Now available as a download; Dec. 27, 2007; Microsoft Corporation; 2 Pages.*

* cited by examiner

*Primary Examiner* — Christopher Revak
*Assistant Examiner* — Vadim Savenkov

(57) ABSTRACT

A method, system, and medium are provided for managing application and content downloads to mobile devices from trusted domains. A dynamically updateable list of trusted domains is provided to a mobile device. In response to an attempted download by a server, a component of the mobile device compares the server's domain to the list of trusted domains and allows the server to download content and/or applications without requiring permission from a user. The list of trusted domains can be updated over the air by communicating replacement lists to the mobile devices.

8 Claims, 6 Drawing Sheets

DETERMINING TRUSTED SOURCES FROM WHICH TO DOWNLOAD CONTENT TO A MOBILE DEVICE

SUMMARY

Embodiments of the invention are defined by the claims below, not this summary. A high-level overview of embodiments of the invention are provided here for that reason, to provide an overview of the disclosure.

In a first aspect, a set of computer-useable instructions provides an illustrative method for managing trusted domains from which content or applications can be downloaded without requiring user permission. In one embodiment, a mobile device receives an indication that a server is attempting to transfer content to the device. A dynamically updateable list of trusted domains is referenced, and if the server is associated with a trusted domain, the transfer is allowed.

In a second aspect, a set of computer-useable instructions provides a second illustrative method for managing trusted domains from which content or applications can be downloaded without requiring user permission. A dynamically updateable list of trusted domains is generated and provided to a client device. According to an embodiment of the present invention, a determination is made that a first domain should be added to the list of trusted domains. An updated list of trusted domains is dynamically generated and provided to the client device.

In another aspect, a set of computer-useable instructions provides another illustrative method for managing trusted domains from which content or applications can be downloaded without requiring user permission. According to an embodiment, a first dynamically updateable list of trusted domains is provided to a device. Upon determining that the first list of trusted domains should be replaced with an updated list that includes a newly trusted domain, an updated list is generated and associated with a configuration update document. The configuration update document is provided to the device along with instructions to provide the updated list of trusted domains to the domain manager.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and methods for managing a list of trusted domains from which content can be received by a mobile communications device without user permission.

Throughout the description of the present invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. Further, various technical terms are used throughout this description. An illustrative resource that fleshes out various aspects of these terms can be found in Newton's Telecom Dictionary by H. Newton, $24^{th}$ Edition (2008).

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
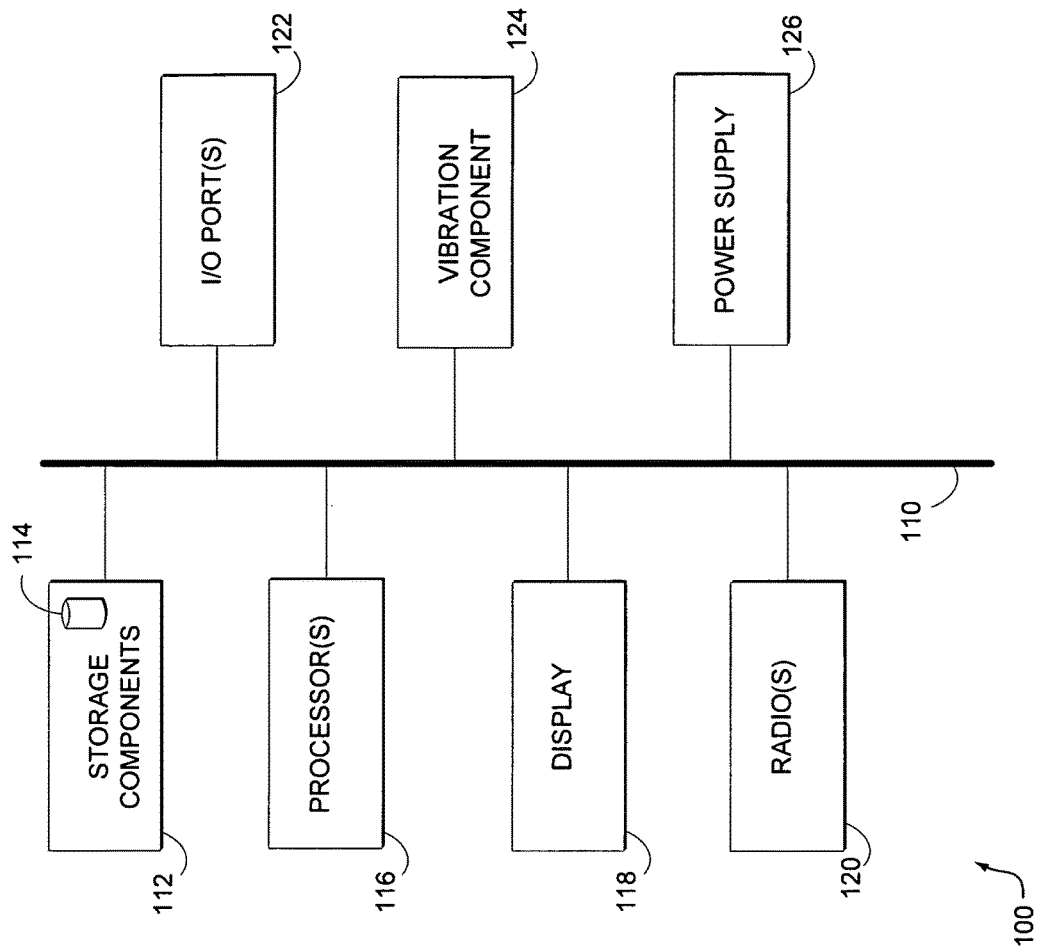
FIG. 1 is a block diagram of an exemplary mobile communications device that is suitable for operation of an embodiment of the present invention.

FIG. 1 depicts an illustrative block diagram of a mobile communications device that is suitable for operation of an embodiment of the present invention. Throughout this disclosure, reference will be made to a mobile communications device, such as in FIG. 2A and beyond. FIG. 1 depicts a selection of components that will generally be included in the mobile communications device to help facilitate various functional aspects of embodiments of the invention. As shown, a bus 110 couples, directly or indirectly, the following illustrative components: a storage component 112, a processor 116, a display 118, a radio 120, input/output ports 122, a vibrating component 124, and a power supply 126.

Storage components 112 may take the form of the aforementioned computer-readable media. As with all of the illustrative components of FIG. 1, although we refer to them sometimes in the singular, that should not be read so as to imply that we mean only a single of each of the components is contemplated within the scope of our invention. To the contrary, by way of example, storage component or components 112 may actually be composed of constituent storage components located within mobile device 100. A portion or separate storage component includes data store 114. In one embodiment, as will be explained in greater detail below, data store 114 can be used to store a dynamically updateable list of trusted domains that can be used to determine whether to allow an application server to install an application without requiring user permission.

Processors 116 facilitate a flow of information among all or a portion of the components shown in FIG. 1 as well as computer-usable instructions that help facilitate various aspects of the present invention. For example, in one embodiment, an operating system of mobile device 100 also helps coordinate various functional aspects of the present invention. Processors 116 operate in connection with running such an operating system.

Radios 120 facilitate the communication of wireless communication signals to and from mobile device 100. Illustrative protocols that can be utilized in connection with an embodiment of the present invention include CDMA, TDMA, GSM, GPRS, EVDO, etc. The radios facilitate wireless communications between the device and a national or even global telecommunications network.

Input/output ports 122 provide a way for mobile device 100 to interact with other peripheral components. Illustrative input/output ports include an ear-piece or headphone jack, a USB port, an infrared port, and the like. Different input/output ports could be provided as is needed to facilitate communication of other peripheral components.

Vibrating component 124 enables mobile device 100 to experience a vibrating action incident to an occurrence of different events. Vibrating component 124 may take on a variety of forms, such as a motor that operates with an offset mass. In one embodiment, vibrating component 124 takes the form of a haptics motor.

Power supply 126 may also take on a variety of forms ranging from a battery to a charging mechanism to other forms of power sources that serve to provide power to mobile device 100.

The selected components of mobile device 100 are meant to be illustrative in nature, and the various lower-level details of the components are not elaborated on so as to not obscure the present invention. Clearly, some of the components may be absent in some embodiments of the present invention, and additional components not shown may also be part of mobile device 100. Attempting to show all of the various components of mobile device 100 would obscure certain novel aspects, and we will refrain from such elaboration at least for the sake of brevity.

Figure 2:
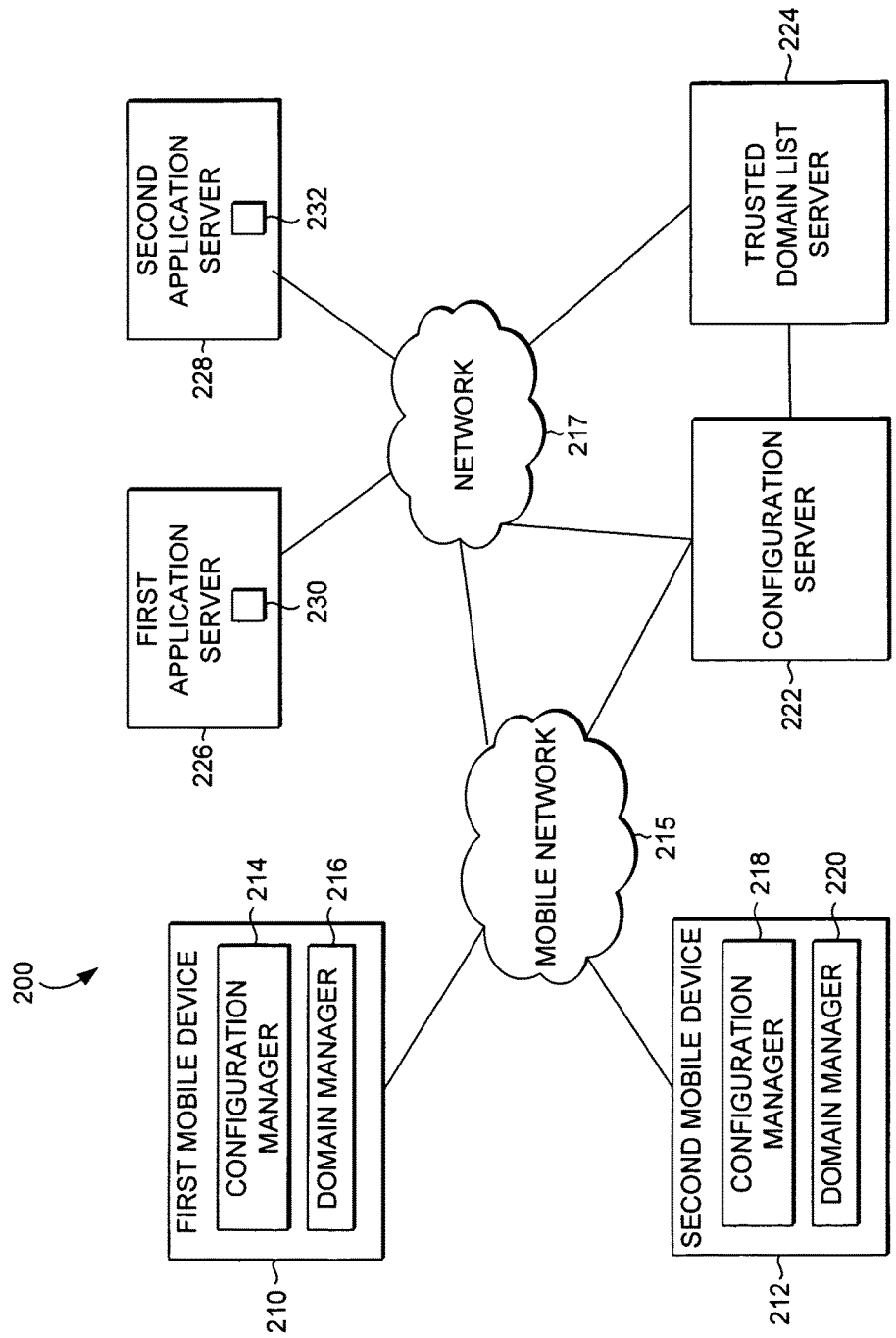
FIG. 2 is a block diagram of an exemplary network environment suitable for implementation of an embodiment of the present invention.

Turning now to FIG. 2, a block diagram is shown that illustrates an exemplary network environment 200 in accordance with an embodiment of the present invention. Network environment 200 includes first and second mobile devices 210 and 212, mobile network 215, configuration server 222, trusted domain list server 224, network 217, and first and second application servers 226 and 228 that are capable of installing applications 230 and 232 onto mobile devices 210 and 212. Network environment 200 is merely an example of one suitable network environment and is not intended to suggest any limitation as to the scope of use or functionality of the present invention. Neither should network environment 200 be interpreted as having any dependency or requirement related to any single component or combination of components illustrated therein.

It will be understood by those skilled in the art that each of these elements of the network environment 200 is also scalable. That is, for example, network environment 200 can include a large number of mobile devices. Additionally, configuration server 222 may actually include a number of configuration servers, operating in parallel with a load balancer such that large amounts of traffic may be managed. Of course, the same is true with any of the other elements of the exemplary network environment 200 such as, for example, trusted domain list server 224, mobile network 215, network 217, and any other network element or server that may be employed in an embodiment of the present invention. Any or all of these servers may be implemented using any number of server modules, devices, machines, and the like.

Mobile network 215 can be any of the various types of mobile networks known in the art and can support, for example, any of the protocols mentioned above with respect to FIG. 1. Network 217 can be a local area network (LAN), a mobile network (MN), or a wide area network (WAN) such as the Internet. Although lines of communication are shown in FIG. 2, these connections are intended to be illustrative only and should not be read to limit the configuration of connections in various implementations of embodiments of the present invention.

First and second mobile devices 210 and 212 are mobile communications devices such as, for example, the mobile communications device 100 described above with reference to FIG. 1. First and second mobile devices each have a configuration manager 214, 218 and a domain manager 216, 220. Although not shown in FIG. 1 to maintain clarity, domain manager 216, 220 can be associated with an install agent. An install agent can perform various functions such as, for example, determining whether to allow an install process, managing installations, and the like. Domain manager 216, 220 can be a component of an install agent, a plug-in to an install agent, a client of an install agent, or a tool used by an install agent.

In any of these roles, domain manager 216, 220 maintains a dynamically updateable list of trusted domains. In some embodiments, domain manager 216, 220 can also be operable to compare domains attempting to install software with the domains represented on the dynamically updateable list of trusted domains. In this way, access can be allowed to an application server associated with a trusted domain without first having to prompt the user with a message and wait for the user to input permission to allow access.

Moreover, the list of trusted domains maintained by domain manager 216, 220 can be updated over the air. This capability could improve business relationships between MNOs and third-party vendors (i.e., application servers) as MNOs can provide application servers with access to some or all devices on an MN in a short amount of time. Updates to the list are provided by a trusted domain list server 224, which typically is a server associated with the mobile network 200 (referred to herein as a "network server") working in concert with configuration server 222. In other embodiments, trusted domain list server 224 and configuration server 222 can be integrated as a single server. In an embodiment, trusted domain list server 224 communicates directly with domain managers 216 and 220, and consequently, while there still can be a configuration server 222 in the network environment 200, in some embodiments, its operations can be unrelated to the present invention.

As illustrated in FIG. 2, according to an embodiment of the present invention, trusted domain list server 224 uses configuration server 222 to update trusted domain lists on mobile devices 210 and 212. Upon receiving an indication that a first or second application server 230, 232 is associated with an appropriate business relationship, a determination can be made by trusted domain list server 224 (or other entity) that application server 230, 232 should be included as a trusted domain on the mobile network 215. In another embodiment, that decision is made outside the scope of FIG. 2, and trusted domain list server 224 receives an indication that application server 230, 232 should be included on trusted domain lists as a trusted domain.

Trusted domain list server 224 generates an updated list of trusted domains when appropriate or when instructed to do so. In an embodiment, trusted domain list server 224 provides the updated list to configuration server 222. Configuration server 222 facilitates configuring mobile devices 210, 212 such as by modifying various attributes and applying various settings within the operating environment associated with mobile device 210, 212. The client-side management of aspects of configuration is handled by configuration manager 214, 218. Updates to configuration parameters and attributes are provided by configuration server 222. As configuration typically is unique to particular types of devices or groups of types of devices, configuration server 222 can provide different updates to different mobile devices 210, 212. Configuration server 222 can provide various types of updates such as, for example, updated network access identifiers (NAIs), updated routers for Web browsing, and the like.

To update the configuration of mobile devices 210 and 212, configuration server 222 generates and provides a configuration update document that includes parameter values and settings that are used to replace existing values and settings. Configuration manager 214, 218 receives a configuration update document from configuration server 229. A configuration update document can be generated and formatted in any number of ways. For example, in one embodiment, configuration update documents include XML data. Configuration server 222 can retrieve an updated list of trusted domains from trusted domain list server 224 and can provide the updated list to mobile devices 210 and 212 along with the configuration update document.

In an embodiment, the updated list of trusted domains is appended to a configuration update document for delivery to mobile devices 210 and 212, and in another embodiment, the updated list of trusted domains is embedded within the configuration update document. In some embodiments, configuration server 222 and configuration managers 214 and 218 can be modified to incorporate the list of trusted domains into the configuration parameters, in which case domain managers 216 and 220 and trusted domain list server 224 may not be needed.

In an embodiment, configuration server 222 includes an indication in the configuration update document that indicates to configuration managers 214 and 218 that an updated list of trusted domains is included with the configuration update document. This indication can include instructions or a parameter that causes configuration manager 214, 218 to identify the updated list of trusted domains and separate that list from the configuration update document. Configuration manager 214, 218 can then provide the updated list to domain manager 216, 220. In other embodiments, configuration manager 214, 218 can facilitate the receipt and proper implementation of an updated list of trusted domains. An updated list of trusted domains can be used to replace an existing list. This way, MNOs can update trusted domains at virtually any time, and users' experiences with mobile devices 210, 212 can be improved.

Figure 3:
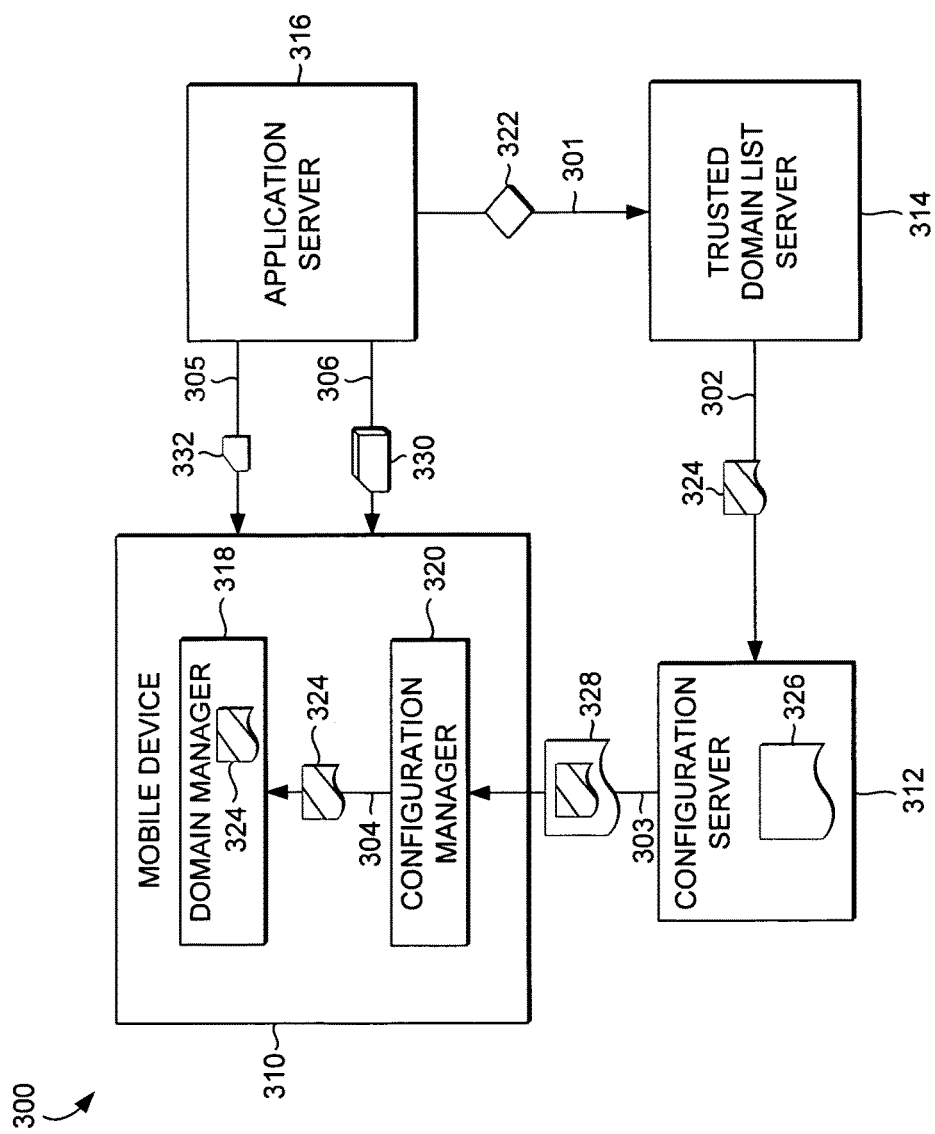
FIG. 3 is a schematic diagram showing illustrative communications within an exemplary network environment in accordance with an embodiment of the present invention.

Turning now to FIG. 3, a schematic diagram is shown that illustrates the operation of an exemplary network environment 300 in accordance with an embodiment of the present invention. Network environment 300 includes a mobile device 310, a configuration server 312, a trusted domain list server 314, and an application server 316. Further, mobile device 310 includes, among other components, a domain manager 318 and a configuration manager 320.

As illustrated at 301, trusted domain list server 314 receives an indication 322 that application server 316 is a trusted domain. Consequently, trusted domain list server 314 generates an updated list 324 of trusted domains and provides the updated list 324 to configuration server 312, as shown at 302. Configuration server 312 generates a configuration update document 326, and associates the updated list 324 with configuration update document 326 such as by embedding updated list 324 within configuration update document 326 or attaching updated list 324 to configuration update document 326. The resulting integrated update communication 328 is communicated to configuration manager 320, as shown at 303.

Configuration manager 320 receives the integrated update communication 328. In an embodiment, configuration manager 320 can scan the communication 328 to determine whether there are any tags or markers of any kind that indicate the presence of updated list 324. Configuration manager 320, in response to instructions or automatically, separates updated list 324 from configuration update document 326 and provides updated list 324 to domain manager 318. Domain manager 318 replaces an existing list of trusted domains with the updated list 324, as shown at 304.

As illustrated at 305, mobile device 310 receives an indication 332 that application server 316 is attempting to download content or install an application on mobile device 310. Indication 332 can be a set of data, part of which can include information related to a domain associated with application server 316. For example, indication 332 can include an IP address associated with application server 316, metadata that includes information from which a domain can be determined, and the like. Domain manager 318 determines a domain associated with application server 316 and compares that domain to the domains that are included on the updated list 324 of trusted domains.

If the domain associated with application server 316 is included on the updated list 324 of trusted domains, domain manager 318 facilitates allowing application server 316 access to mobile device 310 without first prompting a user for permission. Application server 316 can then install application 330 onto mobile device 310, as shown at 306. If the domain associated with application server 316 is not included on the updated list 324, the user can be provided with a prompt requesting user permission to download. In another embodiment, no action is taken if the domain associated with application server 316 is not included on the updated list 324 of trusted domains.

Figure 4:
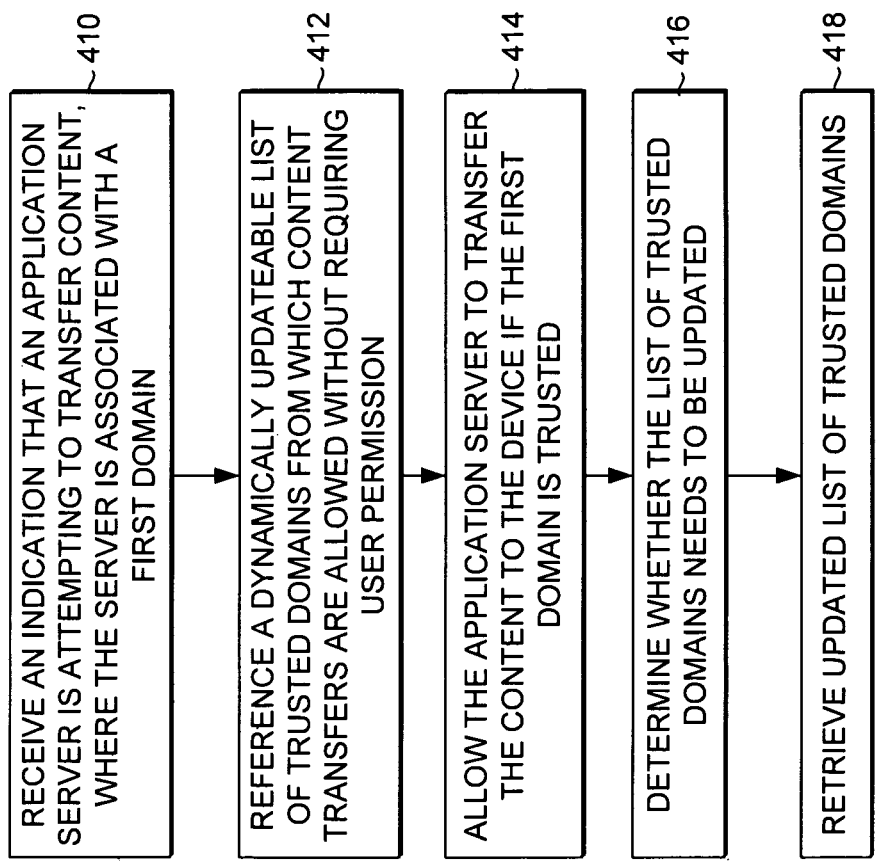
FIG. 4 is a flow diagram showing an illustrative method of managing domains from which a mobile communications device can download content or applications without user permission.

To recapitulate, we have described systems and methods for managing domains from which a mobile communications device can download content without user permission. Turning now to FIG. 4, a flow diagram is shown that illustrates an exemplary method of managing trusted domains in accordance with an embodiment of the present invention. At a first illustrative step 410, an indication that an application server is attempting to transfer content is received. In an embodiment, the server is associated with a first domain such as, for example, a uniform resource locator (URL). In one embodiment, the application server is a content provider. In another embodiment, the server is an application provider.

At step 412, a dynamically updateable list of trusted domains from which content transfers are allowed without requiring user permission is referenced to determine whether the domain associated with the server is trusted. At step 414, the application server is allowed to transfer the content (or application) to the mobile device if the first domain is trusted. At a step 416, which can happen at any point in the process described above, the mobile device determines whether the list of trusted domains needs to be updated. In an embodiment, the mobile device does this by sending a periodic signal to a mobile network server that essentially checks the server to see if there are any updates available. If there are, as shown at step 418, the mobile device retrieves an updated list of trusted domains.

Figure 5:
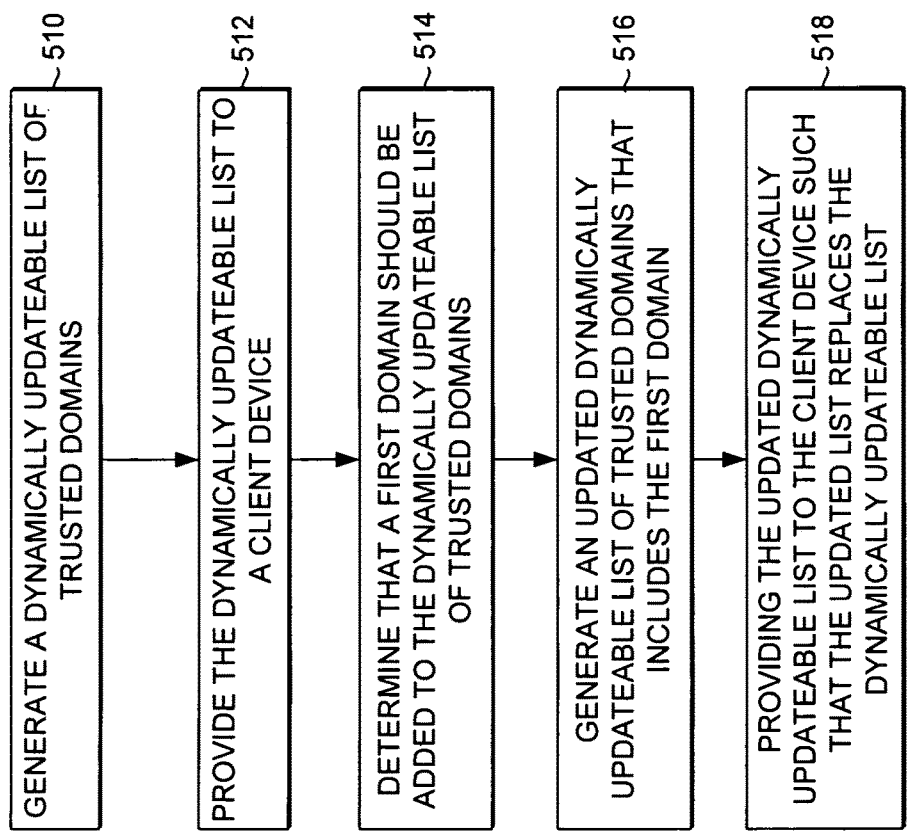
FIG. 5 is a flow diagram showing another illustrative method of managing domains from which a mobile communications device can download content or applications without user permission.

Turning to FIG. 5, another flow chart is shown that illustrates another exemplary method of managing domains from which a mobile communications device can download content without user permission. At a first illustrative step, step 510, a dynamically updateable list of trusted domains is generated. At step 512, the dynamically updateable list is provided to a client device such as a mobile communications device. At a step 514, a determination is made that a first domain should be added to the dynamically updateable list of trusted domains. This determination can be made in response to completion of an appropriate business deal or according to some other criteria desired.

As illustrated at step 516, in response to the determination of step 514, an updated dynamically updateable list of trusted domains is generated. The updated list includes the first domain. At a final illustrative step, step 518, the updated dynamically updateable list is provided to the client device such that the updated list replaces the dynamically updateable list residing on the client device.

Figure 6:
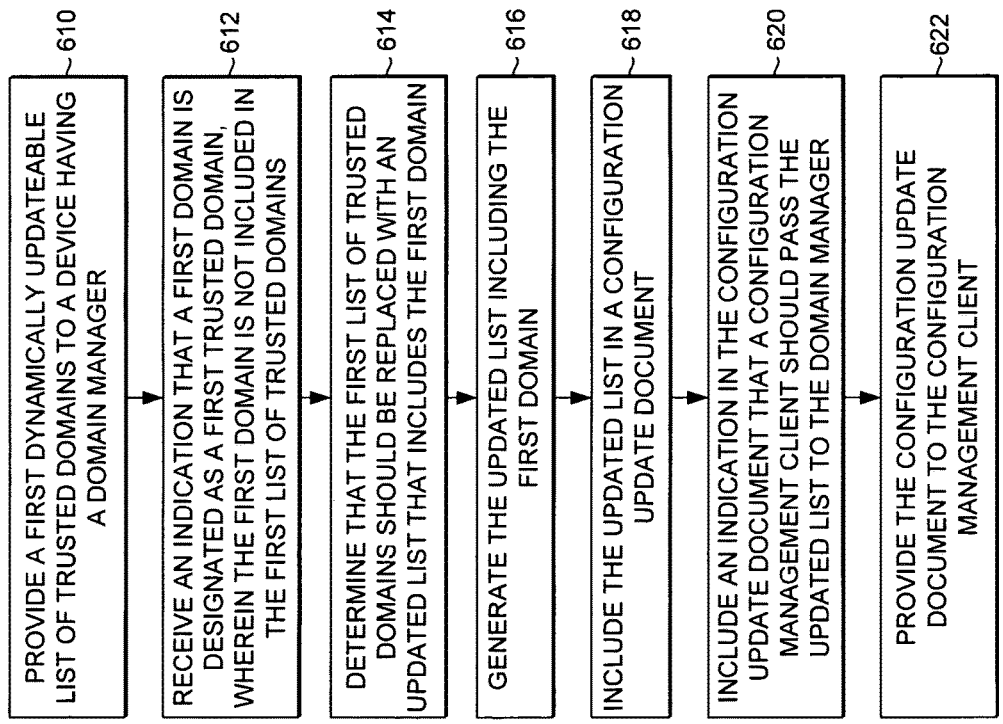
FIG. 6 is a flow diagram showing another illustrative method of managing domains from which a mobile communications device can download content or applications without user permission.

Referring to FIG. 6, a flow diagram is shown that illustrates another exemplary method of managing domains from which a mobile communications device can download content without user permission. At a first illustrative step 610, a first dynamically updateable list of trusted domains is provided to a device that has a domain manager. At step 612, an indication is received that a first domain is designated as a first trusted domain, and wherein the first domain is not included in the first list of trusted domains. Accordingly, as shown at step 614, a determination is made that the first list of trusted domains should be replaced with an updated list that includes the first domain.

At step 616, the updated list that includes the first domain is generated and is included, at step 618, in a configuration update document. As shown at step 620, an indication is also included in the configuration update document that indicates to a configuration management client that the client should pass the updated list to the domain manager. In an embodiment, a configuration management client can primarily carry out instructions provided to it by a network server. In another embodiment, the configuration management client can be a configuration manager as discussed above with reference to FIGS. 3 and 4. In any case, at a final illustrative step, step 622, the configuration update document is provided to the configuration management client.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-executable instructions embodied thereon for performing a method of managing domains from which a mobile communications device can transfer applications without user permission:
   providing a first dynamically updateable list of trusted domains to a mobile communications device having a domain manager that allows applications to be transferred from trusted domains to the mobile communications device without first requesting permission from a user of the device;
   receiving, from the mobile communications device, a first indication that a first domain is designated as a first trusted domain based upon a user input to the mobile communications device, wherein said first domain is not included in the first dynamically updateable list of trusted domains;
   determining that the first dynamically updateable list of trusted domains should be replaced with an updated list that includes the first domain;
   generating the updated list;
   including the updated list in a configuration update document having data for updating one or more attributes of a configuration management client associated with the mobile communication device;
   including a second indication in the configuration update document that the configuration management client should pass the updated list to the domain manager upon receiving the configuration update document, wherein the second indication comprises an instruction to separate the updated list from the configuration update document and provide the updated list to the domain manager; and
   providing the configuration update document to the configuration management client.

2. The media of claim 1, wherein the domain manager comprises a plug-in feature downloaded and integrated with an install agent configured to install content received from the trusted domain on the device.

3. The media of claim 1, wherein including the updated list in a configuration update document comprises embedding the updated list within the configuration update document.

4. The media of claim 1, wherein said second indication further comprises a separation tool for recognizing and separating the updated list from the configuration update document.

5. A mobile device for managing domains from which the mobile device transfers applications without user permission, the mobile device comprising:
   a domain manager that receives a first dynamically updateable list of trusted domains, wherein the domain manager allows applications to be transferred from trusted domains to the mobile device without first requesting permission from a user of the mobile device wherein the domain manager receives a first indication that a first domain is designated as a first trusted domain based upon a user input to the mobile device, wherein said first domain is not included in the first dynamically updateable list of trusted domains;
   the mobile device determines that the first dynamically updateable list of trusted domains should be replaced with an updated list that includes the first domain, obtains the updated list, wherein the updated list is included in a configuration update document having data for updating one or more attributes of a configuration management client associated with the mobile device;

the configuration management client parses the configuration update document for a second indication that the configuration management client should pass the updated list to the domain manager upon receiving the configuration update document, wherein the second indication comprises an instruction to separate the updated list from the configuration update document and provide the updated list to the domain manager, wherein the configuration management client transmits the updated list to the domain manager to alter the first dynamically updateable list of trusted domains with the domains in the updated list.

6. The mobile device of claim 5, wherein the domain manager comprises a plug-in feature downloaded and integrated with an install agent configured to install content received from the trusted domain on the device.

7. The mobile device of claim 5, wherein including the updated list in a configuration update document comprises embedding the updated list within the configuration update document.

8. The mobile device of claim 5, wherein said second indication further comprises a separation tool for recognizing and separating the updated list from the configuration update document.

* * * * *